A. E. RHOADES.
LOOM.
APPLICATION FILED AUG. 29, 1912.
1,089,792.
Patented Mar. 10, 1914.
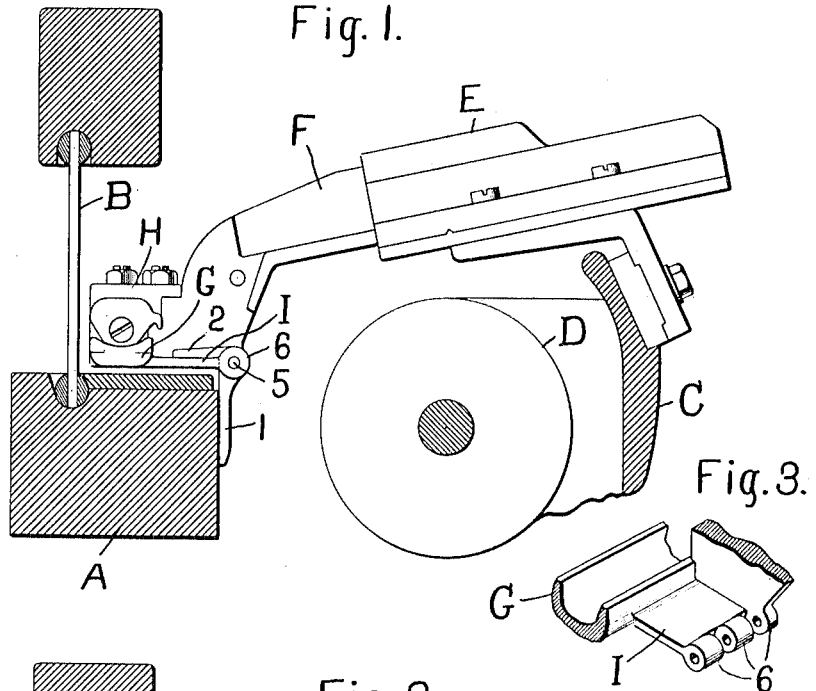
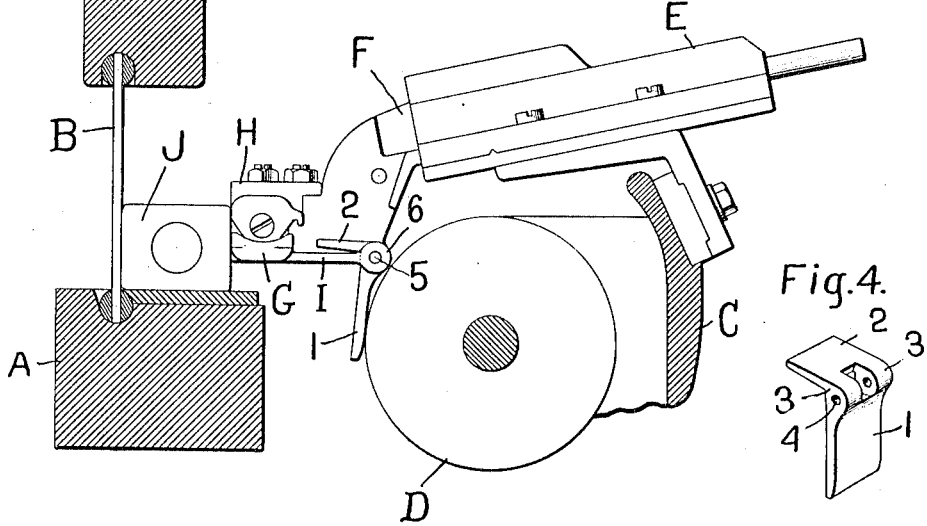
Witnesses.
Thomas J. Drummond
Henry Welch
Inventor.
Alonzo E. Rhoades,
by Edwards, Heard Smith,
Atty's.

UNITED STATES PATENT OFFICE.

ALONZO E. RHOADES, OF HOPEDALE, MASSACHUSETTS, ASSIGNOR TO DRAPER COMPANY, OF HOPEDALE, MASSACHUSETTS, A CORPORATION OF MAINE.

LOOM.

1,089,792.  Specification of Letters Patent.  Patented Mar. 10, 1914.

Application filed August 29, 1912. Serial No. 717,698.

*To all whom it may concern:*

Be it known that I, ALONZO E. RHOADES, residing at Hopedale, county of Worcester, State of Massachusetts, have invented an Improvement in Looms, of which the following description, in connection with the accompanying drawing, is a specification, like characters on the drawing representing like parts.

In a certain type of loom having what is technically termed a "high-roll take-up" the cloth passes directly from the fell to and part way around the take-up or sand roll, which latter is located at a point high up in the loom frame, substantially opposite the lay, and only a short distance therefrom when the lay is at front center. When such a loom is made to take a large shuttle the space is very limited between the reed and the temple head, when the lay is nearest the breast-beam, in actual practice measuring less than the width of the shuttle. As a natural result something must be broken if the shuttle is trapped between the reed and the temple, because the intervention of the shuttle between the reed and the temple tends to push the latter forward to an abnormal extent on the beat up, and owing to the limited space the depending heel of the temple strikes and is stopped by the high take-up roll. The temple heel is usually made as a rigid part of the temple pod and depends therefrom, so that if the trapped shuttle pushes the temple forward and the engagement of the rigid heel and the take-up roll prevents such movement, some one or more of the parts involved must be smashed or seriously injured. In my present invention I have provided means whereby such damage is obviated, and to this end I have so constructed the temple that the head thereof may be moved toward the breast-beam even when the heel engages the sand or take-up roll, if the shuttle is trapped as before mentioned. The change in the construction of the temple to thus obviate breakage interferes in no way with the usual and normal movement of the temple by co-operation of the lay and the temple heel on the beat up.

The novel features of my invention will be fully described hereinafter and particularly pointed out in the following claim.

Figure 1 is a transverse sectional detail of a portion of a loom having a high-roll take-up, with a temple embodying one form of my invention, the lay being shown as substantially at front center and in normal co-operation with the temple. Fig. 2 is a similar view, but showing the shuttle trapped between the reed and the temple, the latter having been moved forward an abnormal distance until its heel has contacted with the take-up roll and has yielded to such contact. Fig. 3 is a perspective detail of a portion of the temple pod to which the heel is yieldingly attached. Fig. 4 is a similar view of the heel, detached.

The lay A, reed B, the breast-beam C, the high take-up or sand roll D, the temple stand E fixedly mounted on the breast-beam and supporting the reciprocating temple shank F, and the head of the temple, comprising essentially the pod G and cap H, may be and are all of well known construction in a loom having a high-roll take-up mechanism. Ordinarily the heel is a rigid depending extension of a shelf-like part 1 of the pod, but in the present embodiment of my invention I make the heel as a separate piece.

Referring to Fig. 4 the heel 1 has a lateral head 2 and laterally separated eyes 3, provided with alined apertures 4 for a pintle 5, Figs. 1 and 2, and a series of tubular, alined and laterally separated eyes 6 are formed upon the shelf 1 of the pod and the adjacent part of the shank. The eyes 3 on the upper end of the heel are interposed between the central and outermost eyes 6, and pivotally connected therewith by the pintle 5, the head 2 resting upon the shelf 1, Fig. 1, and maintaining the heel in fixed position relatively to the temple head when said heel is engaged by the lay. Said head 2 thus serves as a species of stop or detent to limit swinging movement of the heel frontward, but obviously said heel can swing rearward, as shown in Fig. 2.

In Fig. 1 the normal forward movement of the temple is illustrated, the shuttle being properly boxed, the movement of the temple having been effected by engagement of the heel 1 by the lay on the beat up, and it will be observed that there is ample room between the heel and the roll D. Referring to Fig. 2, however, wherein it is supposed that the shuttle J has been trapped between the reed and the temple head, it will be obvious that on the beat up the temple has been pushed forward much nearer the breast-beam than under normal conditions, and had the heel 1 been rigid on the temple a smash would have occurred. By my invention, however, the heel, when moved forward under abnormal conditions into engagement with the roll D, yielded and swung rearward as the temple completed its abnormal movement toward the breast-beam, the stop 2 lifting slightly, as shown. As soon as the loom is restored to proper operative conditions the first forward beat of the lay will restore the heel of the temple to its normal position relative thereto. Hence the yielding heel makes no difference in the operation or action of the temple under normal conditions, but prevents injury when damage would otherwise result from an abnormal forward movement of the temple.

Changes or modifications may be made by those skilled in the art without departing from the spirit and scope of my invention as set forth in the annexed claim.

Having fully described my invention, what I claim as new and desire to secure by Letters Patent is:

In a loom having a lay provided with a reed, and a high take-up roll substantially opposite the lay, in combination with a temple mounted to reciprocate toward and from the take-up roll, a depending heel connected with the temple and in the path of the lay to effect normal movement of the temple upon the beat up, and means to render said heel rigid and immovable relatively to the temple when said heel is struck by the lay and while the latter remains in engagement with the heel and permitting the heel to move rearward when engaged by the take-up roll on abnormal forward movement of the temple during the trapping of the shuttle between the reed and temple.

In testimony whereof, I have signed my name to this specification, in the presence of two subscribing witnesses.

ALONZO E. RHOADES.

Witnesses:
JOSEPH L. REMINGTON, Jr.,
FRANK J. DUTCHER.

Copies of this patent may be obtained for five cents each, by addressing the "Commissioner of Patents, Washington, D. C."